May 4, 1965
E. B. BOYLAN ETAL
3,181,887
SERVICE SYSTEM AND COUPLING MECHANISM
FOR TRACTOR-TRAILER VEHICLES
Filed Aug. 15, 1960
4 Sheets-Sheet 1
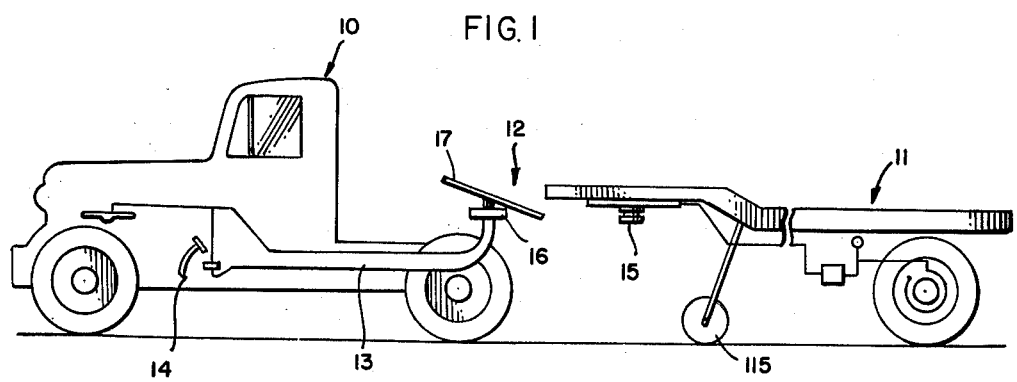
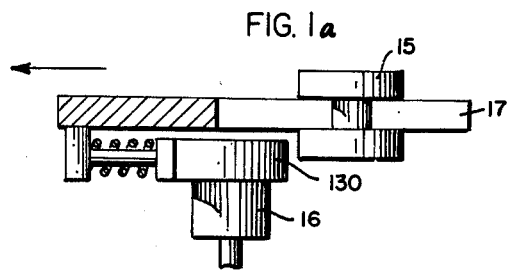
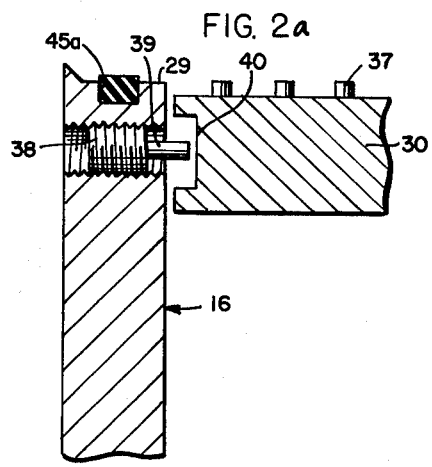
INVENTORS:
EDWARD B. BOYLAN
HERMAN J. WHITE
BERNARD P. BOYLAN
GEORGE J. PYRE
BY
ATT'Y May 4, 1965
E. B. BOYLAN ETAL
3,181,887
SERVICE SYSTEM AND COUPLING MECHANISM
FOR TRACTOR-TRAILER VEHICLES
Filed Aug. 15, 1960
4 Sheets-Sheet 2
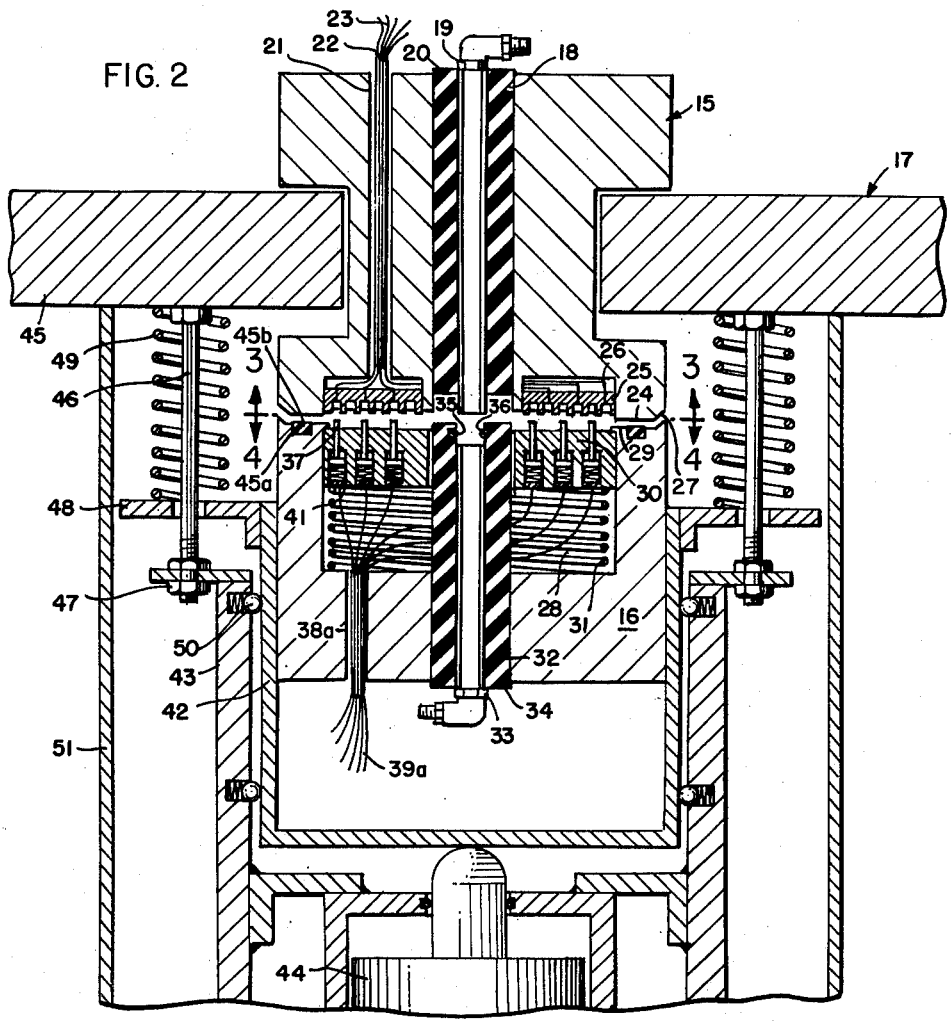
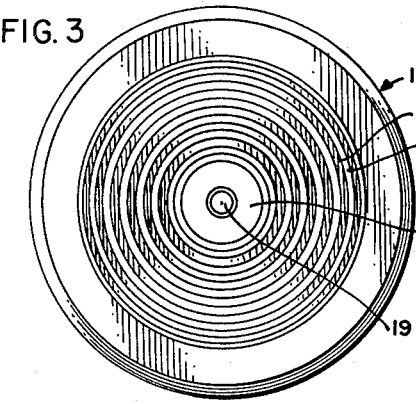
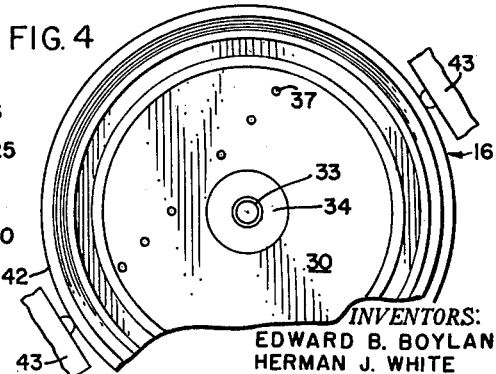
INVENTORS:
EDWARD B. BOYLAN
HERMAN J. WHITE
BERNARD P. BOYLAN
GEORGE J. PYRE
BY
ATT'Y

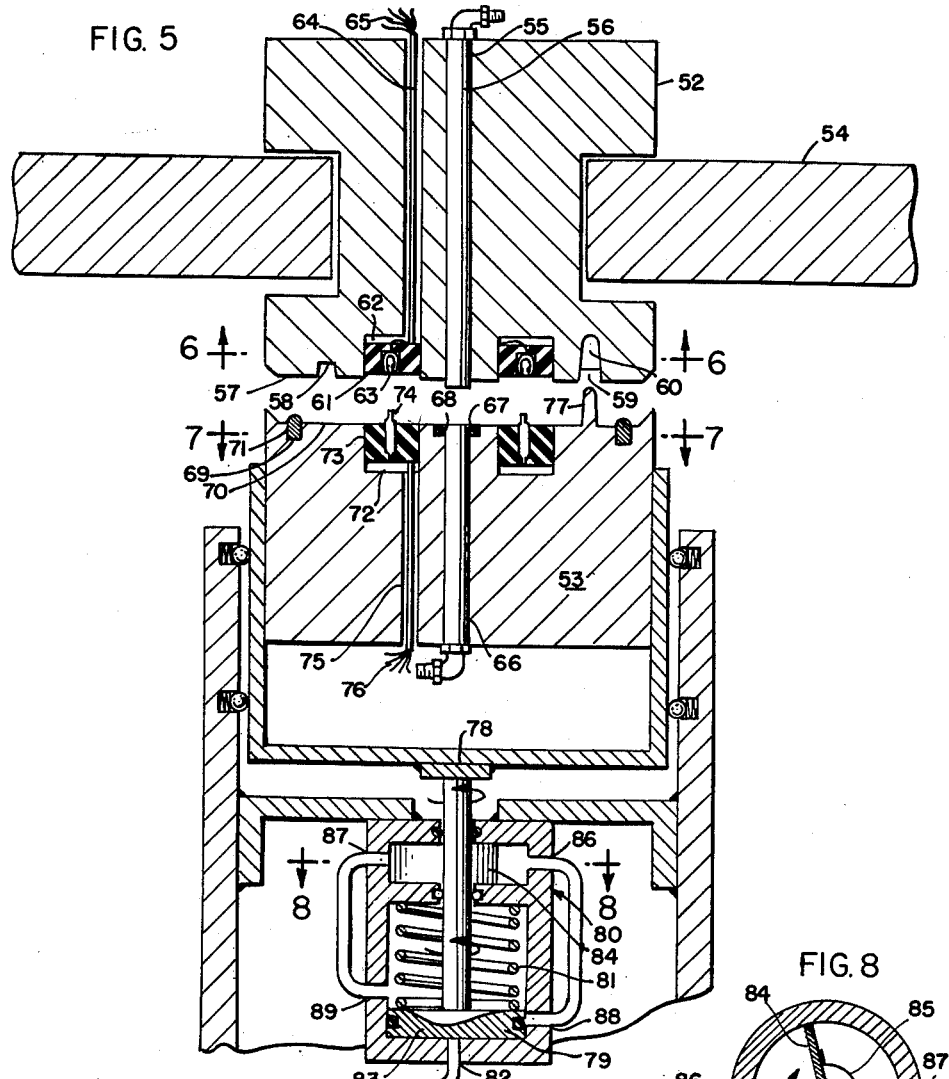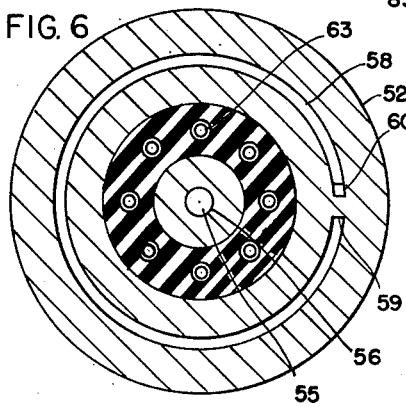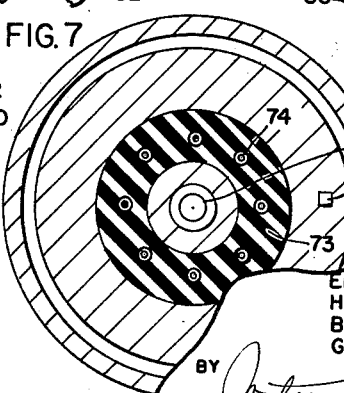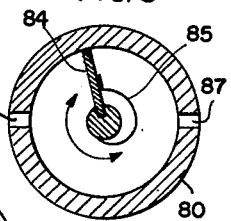

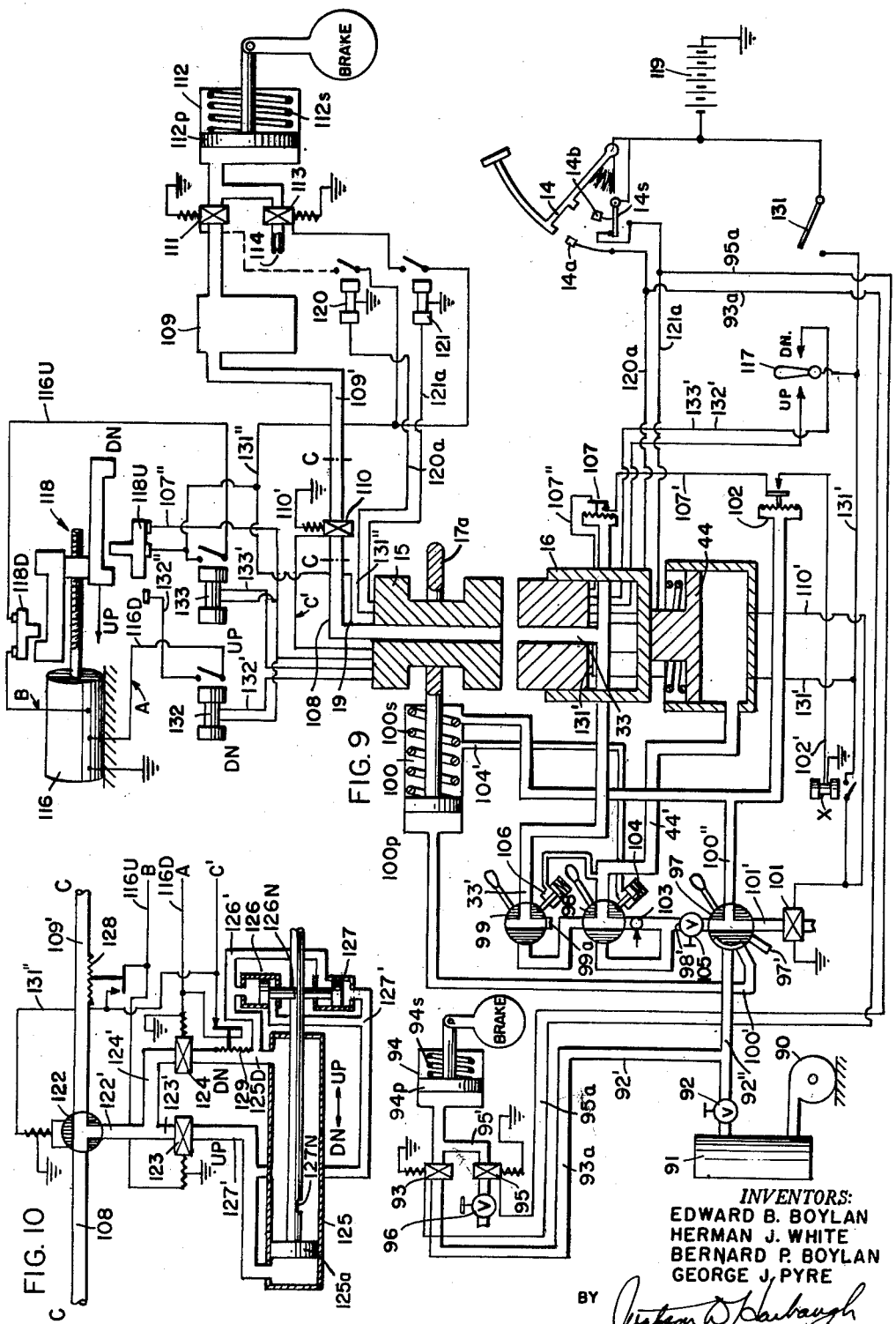

United States Patent Office 3,181,887
Patented May 4, 1965

3,181,887
SERVICE SYSTEM AND COUPLING MECHANISM
FOR TRACTOR-TRAILER VEHICLES
Edward B. Boylan, 4541 S. Le Claire, and Herman J. White, 6033 S. Dorchester, both of Chicago, Ill.; Bernard P. Boylan, 529 Congress, Hillside, Ill.; and George J. Pyre, 4928 N. Francisco, Chicago, Ill.
Filed Aug. 15, 1960, Ser. No. 49,781
25 Claims. (Cl. 280—421)

This invention relates generally to a service system for a tractor-trailer vehicle and more particularly to an improved service system and mechanism for automatically connecting and disconnecting the service lines between the tractor and trailer as the tractor is coupled or uncoupled from the trailer.

In the ordinary tractor-trailer vehicle combination, brakes and accessories on the trailer are usually controlled by air pressure and electric power supplied from the tractor through manually connected lines. There are normally three lines leading from the tractor to the trailer, one being the electrical service line and the other two being the air supply and brake lines for control of the brakes. These lines are usually a flexible rubber hose and are connected to mating lines secured to the trailer. In the conventional hook-up, it is necessary for the operator or an assistant to get out of the cab and attach or detach the lines by hand. The obvious being a loss of time, possible improper connection, plus the inconvenience the operator will endure during inclement weather. Also, the lines are long and are in an outward or exposed position between the tractor and trailer where they may be frequently subjected to snagging or severance.

Several recent developments have to some degree, eliminated the necessity of the long swinging service lines between the tractor and trailer by providing a contact to pass through a fifth wheel mounted on the tractor and a king pin mounted on the trailer. These devices still have many short-comings, not only in the mechanism for coupling of the service lines through the king pin and the fifth wheel but the service systems do not provide safety features needed to protect others as well as the system itself. Too much reliance is placed on the operator's discretion or the proper sequence of operation in the joining of the tractor with the trailer or disconnecting the tractor from the trailer, the problem being that the systems are not completely foolproof.

It is therefore, the primary object of this invention to eliminate the problems and short-comings of the prior art and to provide an improved service system and mechanism to automatically connect and disconnect the service lines between a tractor-trailer vehicle combination.

A specific object of this invention is to provide an improved service system and an automatic mechanism for connecting and disconnecting a tractor to a trailer.

Another object of this invention is to provide an improved service system and a completely automatic coupling mechanism for connecting or disconnecting the tractor-trailer vehicle combination controlled completely from within the tractor cab.

A still further object is to provide an improved service system for a tractor-trailer vehicle combination which, "fails safe," regardless whether there is an electrical power failure, a fluid pressure failure, or both.

A further object of this invention is to provide an improved service system and mechanism for connecting and disconnecting the service lines when a tractor is picking up or dropping a trailer wherein the sequence of operations is predetermined and accomplished without any reliance on the operator's discretion.

A still further object of this invention is to provide an improved king pin on a trailer for coupling with a fifth wheel on a tractor wherein the power service lines are automatically connected.

Another object of this invention is to provide an improved service system and automatic mechanism for connecting and disconnecting the service lines in conjunction with the connecting and disconnecting of the tractor with the trailer whereby the operator from within the tractor cab adjusts the braking action of the tractor brakes to either "lead," "lag" or synchronize with the braking action of the trailer brakes.

Another object of this invention is to provide a connector mechanism mounted on a tractor to coordinate with a fifth wheel to be positioned against a lower mating surface of a king pin on a trailer.

Another object of this invention is to provide an improved system whereby the dolly support wheels may be raised or lowered from within the trailer cab by either the power of an electrical motor or by a fluid pressure system.

Another object of this invention is to provide an improved coupling mechanism for automatically joining a tractor with a trailer which provides a positive connection of the electrical and fluid pressure service lines of the tractor with the trailer regardless of the varying angular relationship of the tractor with the trailer during operation.

A still further object of this invention is to provide an improved coupling mechanism for automatically coupling a tractor with a trailer which provides the connecting of the electrical and air pressure service lines of the tractor with those of the trailer whereby the connecting mechanism automatically orients and aligns itself for proper connection regardless of angular relationship of the tractor when joining with the trailer.

A still further object of this invention is to provide an improved service system and mechanism for automatically connecting and disconnecting the service lines between a tractor-trailer combination in conjunction with the connecting and disconnecting of the tractor with the trailer that is readily adaptable to existing trailers and tractors, inexpensive to assemble and provides ease of maintenance because of the unique arrangement of the compact component parts.

With these objects and other features and advantages of the invention in mind, which will appear from the following description and claims in conjunction with the drawings, the invention consists in the novel construction, arrangement, and the formation of the parts wherein:

FIG. 1 is a diagrammatical showing of a tractor-trailer combination to which this invention is applied;

FIG. 1a is a fragmentary partially cut away view in side elevation illustrating a king pin entering a fifth wheel and engaging a cover plate of a lower connector member of this invention;

FIG. 2 is a fragmentary partially sectioned view in side elevation illustrating the relationship of a king pin with a connector of the fifth wheel in a near engaging position;

FIG. 2a is a fragmentary sectioned view of the lower connector member of this invention illustrating a retaining mechanism for two interrelating parts;

FIG. 3 is a sectional view of a lower portion of a king pin taken along the line 3—3 of FIG. 2 illustrating the relationship of a plurality of contact rings;

FIG. 4 is a sectional view of an upper portion of a connector of the fifth wheel taken along the line 4—4 of FIG. 2 illustrating the relationship of a plurality of contact pins;

FIG. 5 is a fragmentary partially sectioned view in side elevation of another embodiment of the coupling mechanism of this invention;

FIG. 6 is a sectional view of a lower portion of the king pin taken along the lines 6—6 of FIG. 5 illustrating the relationship of a plurality of contact sockets;

FIG. 7 is a sectional view of an upper portion of a connector of the fifth wheel taken along the line 7—7 of FIG. 5 illustrating the relationship of a plurality of contact pins;

FIG. 8 is a sectional view of a locating mechanism of the connector taken along the line 8—8 of FIG. 5;

FIG. 9 is a schematic view of the power service system of this invention utilizing an electric motor for controlling the position of the dolly support wheels; and FIG. 10 is a fragmentary schematic view of an air cylinder system that may be substituted for the electric motor system in FIG. 9 for controlling the position of the dolly support wheels.

In brief, the invention provides an improved service system for the control of the braking power of the trailer in conjunction with the tractor brakes and includes a novel mechanism for the automatic connecting and disconnecting of the tractor with the trailer which serves as a means to connect the service lines between the tractor and trailer. The system has been so designed to "fail safe" if there is a failure of power and the controls to be utilized by the operator are so interconnected that it is impossible for the operator to err in the sequence of operations while picking up or dropping the trailer. From the following description and procedure of operation it will be readily understood that the system is completely automatic and operable from within the tractor cab and that every precaution has been taken to insure that the connecting mechanism, the service system and the controls are provided with every safety feature available to afford maximum protection for the operator, the system and the public during the operation of the tractor-trailer vehicle combination.

Referring now in detail to the drawings, specifically FIG. 1, the tractor-trailer combination to which this invention is applied is illustrated by a tractor 10, a trailer 11 and a connecting mechanism 12 for joining the tractor and trailer into one operable unit. The service system for the control of the braking power, indicated generally by a number 13, is operated through a braking lever or pedal 14 from within the vehicle cab.

Referring now to FIGS. 2, 3, and 4, the connecting mechanism 12 is shown in detail in a near engaging position with an upper section 15 of the mechanism secured to the trailer 11, well known in the art as a king pin, and a lower portion or connector 16 of the mechanism designed to resiliently engage the king pin to provide a continuous flow path for the air pressure at the conventional pressure of 90 p.s.i. and electrical power at approximately 12 volts D.C. from the tractor to the trailer. A standard fifth wheel bolt assembly 17 is designed to engage and secure the king pin 15 into a locked relation whereby the king pin is in alignment for receipt of the connector 16. A centrally positioned circular opening 18, passing through the length of the king pin, has a portion of metallic conduit 19 disposed therein through which the air pressure for the trailer brakes may pass. An insulating sleeve 20 encircles the air pressure conduit 19 and is in forced contact with the side walls of opening 18 to provide electrical insulation for the king pin as an electrical current is conducted along the conduit 19 as will be described later. Off-set from the centrally located opening 18 is another circular opening 21 also passing through the length of the king pin, through which an electrical cable 22 is received. The cable is made up from a plurality of lead wires 23, which carry the required electrical service to the component parts on the trailer. Detachably secured to a grooved lower surface 24 of the king pin is a contact block 25, made from a substantially rigid dielectric material, in which a plurality of socket rings 26 are formed, each of which is connected to one of the lead wires 23. As viewed in FIG. 3, each of the socket rings forms a completed path in concentric circles about the central opening 18. The block 25 is so positioned with the king pin whereby a small space is provided between its upper surface and the king pin for the locating and securing of the wires 23 from the cable 22 to the sockets 26 while the lower surface of the block 25 is substantially recessed above the lower surface 24 of the king pin for engagement with the connector 16. The periphery 27 of the lower surface of the king pin is angularly formed for cooperative engagement with an angularly recessed upper surface of the connector 16. The conduit 19 extends outwardly a short distance from the insulating sleeve 20 whereby a leakproof seal may be formed with the connector 16 when they are brought together into an operating position.

The connector 16 has a cylindrical outer surface with an outside diameter substantially exceeding the largest outside diameter of the king pin 15. A large internal recess 28 is machined in an upper surface 29 of the connector in which a contact block 30 is resiliently mounted. The block 30 is continuously urged in an upward direction against the king pin by the force of a compression spring 31 disposed between the connector and the block. A centrally positioned circular opening 32 is machined throughout the length of the connector 16 for receipt of a length of conduit 33 which is encircled by an insulating sleeve 34, similar to the sleeve 20 around the conduit 19 of the king pin. Insulating sleeve 34 extends upwardly past the end of the conduit 33 and has a sealing groove 35 machined on the inside diameter of the portion extending above the end of the conduit. A resilient sealing member 36, such as the well known O-ring, is positioned within the groove 35 to provide a leakproof seal as the extending end of the conduit 19 telescopes within the insulating sleeve 34 when the connector 16 is placed into an operating position against the king pin. The contact block 30, made from a suitable rigid dielectric material, is free to reciprocate about the insulating sleeve 34 within the recess 28 and provides a plurality of contact pins 37 which are mounted on the upper surface in such a position that each of the contacts mate with a socket 26 in the king pin when in the operating position. Each of the contact pins 37 is resiliently mounted in the block and is continuously urged in an upward direction by a compression spring 41. The combination of each contact pin resiliently forced in an upward direction and the entire contact block urged in an upward direction provides a continual positive contact of the pins 37 with the sockets 26 regardless of the angular position of the tractor relative to the trailer in a horizontal or vertical plane during operation as a combined unit. The arrangement of the contact pins, as readily viewed in FIG. 4, is not in a line passing through the center of the cylindrical connector but a line that forms a chord across the end surface which permits extended spacing between each of the contact pins 37 to assist in preventing any arcing between the adjacent contacts as electrical current passes therethrough to the components mounted on the trailer. Referring briefly to FIG. 2a, the block 30 is slidably secured to the connector by a guide pin 38 which is threaded through the connector. An end 39 of the pin 38 engages an elongated slot 40 formed in the side of the block 30 to provide vertical travel limit stops and to prevent rotation of the block 30 relative to the connector 16. An opening 38a is formed through the connector in an off-set position, similar to the opening 21 in the king pin, through which passes a cable composed of a plurality of lead wires 39a to be connected to the contact pins 37. The connector is secured about its periphery to a yoke 42, which slidably engages a pair of vertical guide members 43, and is actuated for movement in a vertical plane by a piston 44. A groove 45a is machined in the uppermost surface 29 of the connector 16 adjacent the periphery thereof for the receipt of a sealing member such as an O-ring 45b or square ring thereof to provide protection for the electrical contacts against moisture, dirt, dust, etc., as the tractor-trailer combination is in operation and also to seal out contamination when a cover plate, to be explained later, is over the upper surface of the connector when the trailer is disconnected from the tractor.

The vertical guide members 43 are secured to the frame of the tractor at their lower ends and to an under surface 45 of the fifth wheel 17 at their upper ends by means of elongated rod members 46. As illustrated in the drawings, the rod members threadably engage the fifth wheel at one end and join the guide members at the other end by a clamping action of two opposing nuts 47. Encircling the rod members 46 for reciprocating action are bracket members 48 which are rigidly secured to the yoke 42. A compression spring 49, also encircling the rod member to assist the return of the connector to the downward position, has one end bearing against the under surface 45 of the fifth wheel and the other end bearing against the bracket 48. A plurality of roller balls 50 are resiliently mounted in the sides of the guide members 43 for contact with the reciprocating yoke 42 to aid in the alignment of the connector with the king pin and to provide a resilient overall mounting for the connector. A casing or housing 51 completely encloses the entire assembly below the fifth wheel to provide additional protection of the several interrelated parts from contamination.

Thus, it is readily apparent from the above description that once the king pin engages the fifth wheel and is locked in, the connector may be raised into a sealing contact with the king pin to provide a flow path for both the fluid pressure and electrical power. The resiliently mounted contact block 29 and the spring loaded contact pins 37 being continually urged in an upward direction by the compression spring 31 and compression springs 41 respectively plus the combined action of the completely resiliently mounted connector assure a positive engagement of all the electrical contacts regardless of the turning or bouncing motion induced to the connecting mechanism as the tractor-trailer combination is operated. The spacing of the conduits 19 and 33 in conjunction with insulating sleeves 20 and 34, permit a positive leak-proof seal of the air pressure with or without a continuous metal-to-metal contact between the surfaces 24 and 28.

Another embodiment of the coupling mechanism is illustrated in FIGS. 5, 6, 7, and 8. The overall characteristics, function and operation of this embodiment are substantially the same as described for the previous embodiment except for the use of pins and sockets rather than pins and socket rings to make the electrical contact and the provision of a novel orientation and alignment mechanism when connecting the connector with the king pin.

Referring specifically to FIG. 5, the connecting mechanism consists of a king pin 52, a connector 53 and a fifth wheel assembly 54. The king pin 52 has a central opening 55 through the length thereof in which a metallic conduit 56 is rigidly secured with its lowermost end extending downwardly substantially below a lower surface 57. A shallow orientation groove 58 is concentrically formed in the surface 57 and provides a stop 59 and an alignment opening 60 as readily viewed in FIG. 6. A groove 62 is concentrically formed in the surface 57, between the orientation groove 58 and the central opening 55, for detachable receipt of a contact block 61. The block 61, preferably formed from a rigid dielectric material, has a plurality of equally spaced electrical sockets 63 embedded therein. An opening 64, off-set sufficiently from the central opening 55 to terminate in the groove 62, passes through the length of the king pin for receipt of a plurality of lead wires 65, each being connected to a socket 63.

Still referring to FIG. 5, the connector 53 has a central opening 66 formed therethrough with an enlarged retaining groove 67 formed at its upper end for receipt of a sealing O-ring 68. A retaining groove 69 is formed on an upper surface 70 adjacent the periphery of the connector for receipt of a sealing O-ring 71 to provide protection against contamination of the contacts to be described. A groove 72 is formed in the surface 70 between the groove 69 and the opening 66 for detachable receipt of a connector block 73 which provides a plurality of equally spaced contact pins 74 extending in an upward direction above the surface of the block for engagement with the sockets 63. An opening 75, off-set from central opening 66, provides a passage through the length of the connector for a plurality of lead wires 76, each being connected to a contact pin 74. A locator pin 77 is secured to the upper surface 70 to extend upwardly at right angles thereto in juxtaposition with the groove 58 on the surface 57 of the king pin.

The connector is retained in position below the fifth wheel in substantially the same manner as described for the first embodiment. In this embodiment a yoke 78, rigidly secured to the connector, is secured to an actuating piston 79 which not only provides the raising and lowering of the connector, but provides an orientation mechanism 80 integral therewith which is interconnected with the piston 79 for actuation. Referring now to FIG. 5 and FIG. 8, the piston 79 is spring loaded towards the down position by a compression spring 81 and urged to the up position by air pressure entering an inlet port 82 and acting on the piston plunger 83. The upper portion of piston 79 houses the orientation mechanism 80 which consists of a pressure blade 84 urged in one direction by a torque spring 85. The blade 84 is secured to the plunger 83 which is in turn secured to the yoke 78 on the connector. Therefore, any movement of the blade 84 will rotate the connector 53. The mechanism 80 is provided with two pressure ports 86 and 87, each of which interconnect with the piston 79. By varying the positions of interconnection of the ports 86 and 87 with the piston 79, pressure will act on one side of blade in advance of a counter pressure on the other side of the blade. The desirability of this arrangement or sequence of pressure application will be more readily understood from the operation of this connector which follows.

In operation, the connector of this embodiment is raised by the piston 79 into contact with the king pin. The locator pin 77 engages the groove 58 and prevents further upward travel of the connector until the pin is aligned with the opening 60. As the plunger 83 starts upward, a port 88 on the side of the piston is opened to permit pressure through to port 86 and into the mechanism 80 which, when the pressure on the blade 84 exceeds the force of the torque spring 85, will rotate the connector until the locator pin 77 hits the stop 59. Since an upward force is still being exerted on the connector by the piston 79, as soon as the locator pin 77 hits the stop 59 which means the pin is aligned with the opening 60, the connector rises upwardly into positive connection with the king pin, all of the contact pins 74 engaging the sockets 63 and the extended portion of conduit 56 engaging the sealing O-ring 68. As the connector completes its upward travel, a port 89 on the side of the piston 79 is opened to permit pressure through port 87 to act on the other side of the blade 84. Since the pressure on both sides of the blade is now equal a balanced system is provided to assist the rotary motion of the piston as the angular position of the tractor varies with the trailer during operation.

It is readily apparent that the embodiment just described provides a positive pin and socket electrical connection for the plurality of leads with the rotative movement being carried by the plunger 83 within the piston 79 instead of making the electrical connections by means of the pins riding in circular sockets as the tractor turns relative to the trailer as previously described. The coordination and interconnecting of the mechanism 80 with the piston 79 provides a completely automatic orientation and alignment of the pins with the sockets to insure proper engagement of the connecting mechanism.

Referring now to FIG. 9, the service system of this invention for controlling the braking power of a tractor-trailer combination is illustrated in a pictorial schematic with the service lines being connected through the connecting mechanism 12. The braking action of this system is brought about through the application and control of the air pressure to the brakes which is the standard medium for this type of braking system. It is, of course, feasible to utilize a liquid medium if proper control is available when exhausting or bleeding away the pressure to apply the brakes. The air pressure of the proposed system is derived from a compressor 90 rigidly mounted on the tractor and operated through the energy produced by the tractor engine. An outlet from the compressor enters a pressure tank 91 which provides a hand operated control valve 92 in its discharge line to permit a complete shut off of the overall pressure system to facilitate repairs. The discharge line from the tank is bifurcated with one line 92′ extending to a tractor braking system while the other 92″ terminates into a plurality of control valves to be explained. Installed in the line leading to the tractor braking system is a normally deenergized opened solenoid operated shut-off valve 93 to control the pressure going to a braking cylinder 94 to displace piston 94p for releasing the brakes. Interconnected between the valve 93 and the cylinder 94 is a line 95′ having an exhaust valve 95, identical to valve 93 normally energized closed through switch 14s, mounted therein with a hand operated needle valve 96 connected to the discharge side of valve 95 to bleed pressure from cylinder 94 when valve 95 is opened to let spring 94s apply the brakes. The hand operated needle valve 96, controlled by the operator from within the cab, works in conjunction with the exhaust solenoid valve 95 to control the rate of application of the brakes by varying the rate of exhaustion of the air pressure. The co-ordination of closing and opening the solenoid valves 93 and 95 respectively is controlled by the operator as he actuates the braking lever or pedal 14 to supply electrical current from battery 119 sequentially through brake switch contacts 14a and 14b, respectively. The advantage of providing the needle valve 96 will be readily apparent upon the completion of the remainder of the specification but the primary advantage is that each operator may set the rate of application of the tractor brakes to his own preference, by merely the opening or closing of the valve 96. Thus, the "jerking" or "jamming" motion created by the trailer when the tractor brakes are applied may be controlled by the use of valve 96, to either apply the tractor brakes in advance of the trailer brakes or to allow the trailer brakes to be applied in advance of the tractor brakes. The tractor braking system just described varies from the conventional braking system in that the brakes are applied with the closing of valve 93 and the exhausting of the applied pressure in cylinder 94 whereas the conventional brake is applied by applying pressure. The novel means of co-ordinating the tractor brakes with the trailer brakes by control of the pressure will function equally as well by controlling the rate of application of the pressure on the brakes in the conventional system as it will in controlling the rate of exhaustion of the pressure in the system of this invention. A safety feature of the proposed system is the automatic application of the tractor and trailer brakes upon failure of the air pressure in the system.

The second line 92 of the bifurcated discharge line from the tank 91 terminates into three multi-directional control valves 97, 98 and 99, shown in resting position, each of which are interlocked with the other to prevent an inoperative sequence of procedure. The first hand lever operated valve 97 has one inlet port and five discharge ports; one 100′ normally in communication with pressure line 92″ connecting to one side of a piston operated locking bolt 100 to release the king pin and when vented through exhaust 97′ to secure the king pin 15 in locked relationship to the fifth wheel by spring 100s, a second 101′ discharge port leading to a normally closed solenoid shut-off valve 101 energized open which permits exhausting the entire pressure system to atmosphere, a third 98′ discharge port extends to the second hand-control valve 98, a fourth 100″ discharge port connects to the other side of the locking bolt piston 100 and a fifth 97′ discharge port leads to atmosphere to permit the exhausting of the pressure in the first discharge port 100′ when the handle of valve 97 is moved counterclockwise to apply pressure to the service pressure system. A pressure transducer 102 is mounted in the flow line 100″ between the valve 97 and piston 100 which is designed to "make" contact with a dolly wheel control circuit 102′ and relay X at a pressure of over 15 p.s.i. and to "break" contact at any pressure below 15 p.s.i. The utilization of pressure transducer 102 is a safety device to insure complete exhaustion of the service pressure system when so desired only when the dolly wheels are in the down position. A more detailed discussion of this and other safety devices throughout this invention will follow.

The second multi-channel hand control valve 98 has one inlet port and three discharge ports; the inlet port is attached to a bifurcated discharge line 98′ of valve 97 with the other line having a check valve 103 mounted therein to prevent flow into one of the three discharge ports, a second discharge port 44′ extends outwardly and serves as an inlet to a piston 44 which is utilized for raising and lowering the connector 16 into contact with the king pin, as described in detail above, and a third discharge line 99′ extends outwardly and functions as an inlet line to the valve 99. A spring loaded, pressure actuated lock pin mechanism 104, is mounted in the valve 98 whereby the valve cannot be operated until the locking bolt piston 100p has locked the king pin to the fifth wheel. It is readily apparent from the drawings, that the location of a port 104′ on piston 100 for a control line 104″ to the locking pin mechanism 104 is such that no pressure reaches the locking pin mechanism until the lock bolt 17a is in the securing position. This safety feature assures the operator that the king pin is in the proper position to make contact with the connector 16, otherwise it would be possible to damage the connecting member if proper alignment of the king pin was not provided for by this safety control.

A hand operated shut-off valve 105 is mounted in the exhaust line 98′ of valve 97 which serves as an inlet for valve 98. This valve permits the utilization of the proposed system with a conventional system and is optional on a vehicle combination provided with this system. By manually shutting off valve 105, only the lock bolt arrangement of this system is used when connection is to be made with a trailer having the conventional hook-up system.

The third multi-channel hand control valve 99 has one inlet port 99′ connected to a discharge port of valve 98 and provides two discharge ports; one 99a extending to atmosphere to bleed the trailer brake system and a second 33′ extending to the metal conduit 33 in the connector 16 to serve as a main flow line to the trailer brake system. A lock pin mechanism 106, identical with the mechanism 104, is utilized to prevent operation of the valve 99 until the preliminary portion of the air pressure system has been properly prepared. The pressure for releasing the mechanism 106 is derived from the pressure built up in line to the piston 44. Thus, it is seen that the valve 99 cannot be operated until the valve 98 is actuated to the operating position which as explained above, is not operable until valve 97 permits pressure to actuate the lock bolt piston 100. This added safety feature to valve 99 provides knowledge to the operator that the piston 44 has received pressure to raise the connector 16 to make a sealing contact with the king pin 15. If a high velocity escape of air were permitted between the king pin and the connector, there is a possibility of damaging the seals in addition to overworking the compressor. Thus, the safety mechanism 106 prevents such damage by permitting operation of valve 99 only after pressure has raised the connector into sealing contact with the king pin. A pressure transducer 107 is mounted in the main flow line from valve 99 to provide an additional safety feature which will be readily understood as the discussion proceeds. The transducer 107 functions in reverse of similar transducer 102, that is, it opens or "breaks" the circuit 107" upon a pressure over 15 p.s.i. forming in the flow line 33'.

All of the component parts and controls described so far in the schematic of FIG. 9 have been integrally formed or mounted on the tractor. The controls are all within the tractor cab and within ready reach of the operator, and it is to be understood that pressure gauges, warning indicators or both, may be mounted and attached to any of the aforesaid flow lines or controls to provide the operator with a visual representation of the action and condition of the component parts. All of the valves and flow lines utilized in this system may be provided with standard air pressure connectors, and flexible conduits are utilized in many areas to facilitate assembly and disassembly of the system.

Still referring to FIG. 9, the following discussion pertains to the component parts and units of the service system that are secured to the trailer portion of the tractor-trailer combination. An inlet line 108 connects to the conduit 19 which extends above the uppersurface of the king pin and provides a flow passage to a pressure tank 109. Mounted in the line between the king pin and the tank is a normally open solenoid operated shut-off valve 110 energized closed which is capable of completely shutting off all of the pressure to the trailer brakes when it is in the closed position. Leading from the tank 109 is a brake control system similar to that described for the brake system of the tractor. A normally deenergized open solenoid shut-off valve 111 is mounted between the tank 109 and a braking cylinder 112 in which the spring 112s actuates the brake and the pressure driven piston releases it. Connected at a point between valve 111 and cylinder 112 is an exhaust line having a normally open energized closed solenoid operated shut-off valve 113 mounted therein for exhausting the brake system in conjunction with a bleed 114 mounted on the discharge side of valve 113, for controlling the rate of exhaustion of the air pressure or rate of braking. The control of the solenoid valves 111 and 113 respectively is by relays 120 and 121 energized through lines 120a and 121a, respectively, by actuation of the braking lever or pedal 14 from within the tractor cab. When energized valve 111 cuts off the air supply to the cylinder 112 and valve 113 opens to bleed off the pressure present and permit spring 112s to apply the brakes.

The dolly support wheels 115 (FIG. 1) are positioned in either the extreme upward (UP) or downward (DN) position by means of an electric motor system or through an alternative air cylinder system. Still referring to FIG. 9, considering first the electric motor system for controlling the dolly wheels, a D.-C. reversible motor 116, connected to a suitable gear box which employs at least one low pitch worm gear, is actuated by a dolly reversing switch 117 within the tractor cab when the controlling circuit for the actuation of the motor has been conditioned by the proper preliminary sequence of operation; namely, the "making" of contact by pressure transducers 102 and 107. A rotary limit switch, indicated by the numeral 118, is secured on the shaft of the motor and serves as a control for de-energizing the motor upon the dolly wheels reaching the extreme upward or downward position.

The power for operation of the electrical system is provided by a twelve volt battery 119 mounted in the tractor and controlled by a master switch 131 with the main electrical power line 131' from the battery connected to the pressure conduit member 33 at a point where it extends outwardly from the bottom of the connector block 16. Likewise, a take off electrical power line 131" for the trailer is secured to the pressure conduit 19 at a point where it extends above the king pin 15. By being insulated from the mass of the king pin and the connector, the conduit members 19 and 33 respectively serve not only as a flow passage for the fluid pressure but as a conductor for the ungrounded electrical power lines 131' and 131". As discussed above and readily viewed in FIG. 9, the solenoid valves 93 and 95 of the tractor brake system are controlled through lines 120a and 121a are actuated through lines 93a and 95a at the same time as the solenoid valves 111 and 113 of the trailer brake system when the operator presses the brake pedal 14 sufficiently to energize relays 120 and 121 to which the solenoid valves are connected.

The exhaust solenoid operated valve 101 on the tractor and the inlet solenoid valve 110 on the trailer are interconnected for co-ordinating action and require several preliminary conditioning steps before they are energized to seal the air system or de-energized to vent the system which include the rotary limit switch 118 and the pressure transducers 102 and 107. The specific function of each of these devices and their cooperation will be further explained in the operational procedure to follow.

Referring now to FIG. 10, the air cylinder system embodiment for control of the dolly support wheels is illustrated with the main inlet conduit having its ends denoted as C—C to indicate the position in the overall system shown in FIG. 9 to which this air cylinder system may be interposed. To change from the electric motor system to the air cylinder system for raising or lowering the dolly wheels it is a mere matter of connecting the conduit ends C—C into the air flow line at the indicated break points C—C and connecting wires A to A, B to B and C' to C' in FIG. 9. The air cylinder control unit consists of a three way solenoid operated control valve 122 which functions primarily the same as the solenoid operated valve 110 of the system described in FIG. 9 and is interconnected for co-ordinating action with the exhaust solenoid operated valve 101 as stated above for the replaced solenoid valve 110. De-energized it is in the position shown. Energized when switch 131 is closed and pressure transducers 107 (no pressure) and 102 (with pressure) are closed to energize relay X with rotary limit switch 118U in the position shown (FIG. 9) (dolly wheels down) the valve 122 moves a quarter turn counter clockwise. Extending from one of the two discharge ports of the valve 122 is a bifurcated conduit 122' with each of the two parallel lines 123' and 124' having solenoid operated control valves 123 and 124 mounted therein. The outlet 125' and 125" from each of these solenoid valves extends respectively to the opposite ends of an air cylinder 125. Since it is desirable to have pressure applied to only one end of the piston 125a at a time the solenoid valve 123 is provided as a normally energized open valve energized from line 116U when switch 117 is moved to UP position rotary limit switch 118D is closed (dolly wheels down) and the similar solenoid operated valve 124 is normally a closed valve energized open from line 116D when switch 117 is moved to DN position and rotary limit switch 118U bridges contacts of lines 131" and 132". To provide a positive lock of the dolly support wheels at either of the extreme positions, rather than to rely on a holding force of air pressure, a spring (not shown) loaded locking mechanism has been provided for each of the extreme positions. The locking mechanisms 126 and 127 are identical and each is provided with an inlet and an exhaust port reversibly connected to the two piston inlet lines. As the pressure is applied to one end of the piston 125a in cylinder 125 a similar pressure is applied to one end of the locking mechanism 127 forcing it inwardly towards a locked position with notch 127N and at the same time supplying a pressure to the then holding locking mechanism 126 to release it from notch 126N and permit the piston 125 to move. We therefore have not only a spring loaded locking mechanism for each of the extreme positions of the dolly wheels but we also have a fluid pressure assisted mechanism to move the locking pins into and out of the locking position. A pressure transducer 128 is mounted in the other discharge conduit 109′ of the valve 122 to co-ordinate with a second pressure transducer 129 mounted in an exhaust line of the normally closed solenoid operated valve 124. These two pressure transducers are interconnected with the limit switches 118 actuated by the shaft of piston 125a, the exhaust solenoid valve 101 and the inlet solenoid valve 122 through line 110′ controlled by relay X to receive power from line 131′. It is readily apparent that by the utilization of two additional solenoid valves 123 and 124 and the piston 125, control of the dolly support wheels and the securing of them in either the extreme upward or downward position may be accomplished by the use of an air cylinder in place of an electric motor and gear box system as previously described.

Referring now for a moment to FIG. 1a, a cover plate 130 is resiliently held in position against the upper surface 29 of the connector 16 when the tractor is dis-engaged from the trailer. The cover plate is repositioned or moved away from its protective position by the king pin 15 as the tractor is positioned against the trailer for connection and may be secured to the frame structure of the tractor by any suitable means and is preferably formed from a hardened resilient material such as rubber.

In operation, assuming the tractor is disconnected from the trailer, the dolly wheels are down and the trailer brakes are in the locked position by spring 112s, the driver will back the tractor into the trailer placing the king pin 15 into the standard opening in the fifth wheel 17 on the tractor. As the king pin approaches the fifth wheel it engages the cover 130 and forces it to a rearward position. Three levers, 97, 98, and 99 have to be actuated in a predetermined sequential relationship. The driver, to assure the locking of the king pin into the fifth wheel, actuates the hand lever 97 90° counterclockwise from the position shown in FIG. 9 and this permits pressure to go from the tank 91 into the cylinder 100 to assist the spring and lock the bolt 17 about the king pin 15. If he tries to move the lever 98 or the hand lever 99 first, nothing will happen as the safety lock mechanisms 104 and 106 are spring latched to prevent movement of these two levers until air pressure releases them as when the king pin is locked by pressure into the fifth wheel by the action of the locking bolt cylinder 100. It is apparent that if the driver should actuate or turn the dolly wheel switch 117 in either direction or the master switch 131 before operating the hand lever 97, nothing would happen as neither the dolly wheel circuit nor the master switch circuit will be completed until the connector 16 engages the king pin to make a positive electrical connection to the elements they control. As the pressure is moving through the hand lever valve 97 the pressure transducer 102 will close and complete its part of the dolly circuit from ground, through relay X, circuit elements 102′, 102, 107′, 107″, to the coils of relays 132 and 133 and also the switch 118U. From the coils of relays the circuit branches through separate lines 132′ and 133′ to power line 131′ through dolly reversing switch 117. From the switch 118U, as closed in the position shown in FIG. 9, the circuit branches to the power line 131″. From either branch when the electrical king pin connections are completed an d the transducer 107 is also closed, the relay X is energized to which the exhaust solenoid 101 and the inlet solenoid 110 (or solenoid valve 122) are connected. Also air pressure will be applied to 104 from the cylinder 100 but none will pass the check valve 103. Having locked the king pin into the fifth wheel with piston 100p the driver can then make the electrical power connection by actuating the hand lever 98 to raise the connector 16 into contact with the king pin to complete the circuit itemized and switch 121 may be closed next to energize and close valves 101 and 110 until pressure is applied to transducer 107 to again open the switch. It bears repeating that movement of lever 98 is not permitted until the lock pin safety mechanism 104 has been removed by the application of pressure thereon from the lock bolt cylinder 100. As the valve 97 was placed in the operating position, the head side of the lock bolt piston was exhausted to atmosphere. The lock bolt is held in the locking position by means of the compression spring and is assisted by the pressure from hand valve 97.

As the hand lever 98 is moved counterclockwise 90° from its resting position shown into an operating position the pressure from valve 97 is permitted to bypass the check valve 103 and flow to the piston 44 which will move the connector 16 into a positive sealed position against the connector pin 15. The advantage of the locking pin safety mechanism 104 is now quite apparent as one would not wish to raise the connector 16 into a locking position with the king pin 15 if the king pin was not fully engaged with the fifth wheel. The possibility of material damage to the contacts of the connector 16 and the mating surfaces of king pin 15 is eliminated by this safety feature. Again, if the operator has placed the dolly wheel switch 117 in either the upward or downward position prior to the placing of the hand valves to their operating positions nothing will happen to the dolly wheel except the dolly wheels might be lowered while the brakes are set after valves 97 and 98 have been activated and before valve 99 has been actuated. The control circuit for the movement of the dolly wheels is conditioned by the pressure transducer 102, now closed and transducer 107 still to be closed and the limit switch 118 bridging lines 131″ and 107″. With the dolly wheels "up" energization of the relay 133 (UP) would involve a circuit open at switch 118D, and, with the dolly wheels down energization of the relay 132 (DN) would involve an open switch contact at 132″. In the instance considered here energization of the relay 133 (UP) would activate the motor to raise the dolly wheels, something desirable with the brakes locked. This activation will start with the dolly control circuit including power line 131′, the dolly reversing switch 117, line 133′, relay coil 133, lines 107″ and 102′, closed transducers 107 and 102, and relay X to ground. The relay coil 133 would close its switch to complete the motor circuit from power line 131″ through line 116D, closed limit switch 118D and the motor 116 to ground. The motor would run until the limit switch 118D was opened by action of the shaft 118 and this dolly control circuit would remain intact until hand valve 99 is actuated and pressure on the switch 107 opens it, deenergizes relay X to open solenoid valve 110 and release the brakes. Thus, the dolly wheels may only be raised while the trailer brakes are set. Likewise, if the master switch 131 for the complete electrical power system is closed, nothing will be actuated until the connector mates 16 with the king pin 15. If the master switch is in the closed position at the time the connector is raised to mate the king pin, the normally closed exhaust valve 101 might be energized if relay X is energized with transducer 107 closed. It would go to its open position but since the hand lever valve 97 has been previously placed in the operating condition, there will be no exhausting of the system as a blank side of valve 97 closes the inlet to the solenoid valve 101. Likewise, at the same time, the normally open inlet solenoid valve 110, which controls the pressure to the trailer brakes, will immediately go to the closed position. This assures that the brakes on the trailer will not be released with the dolly wheels in the extreme downward position and the valve 110 will not go to its normally opened position until the handle of valve 99 is actuated to apply pressure, whereupon the transducer 107 will open and valves 101 and 110 be deenergized. By this time, with dolly switch already moved to UP position, the dolly wheels have reached their extreme upward position, thus providing a safety check that restrains the driver from moving the tractor-trailer combination with the dolly wheels in the downward direction without doing some further act including actuating the dolly switch 117 first. If the driver presses the brake pedal 14 in an attempt to release the trailer brakes, nothing will happen as no pressure has passed the solenoid valve 110 and therefore, the brakes cannot be released in that manner.

Pressure now present against the piston 44 also releases the locking pin 106. Then as the hand lever valve 99 is now rotated 90° counterclockwise to its operating position the pressure not only passes up through the king pin to the solenoid operated valve 110 but also to the pressure transducer 107 to open and dispose of the circuitry which controlled against movement of the dolly wheels during trailer hitching operations. When transducer 107 opens, the valves 110 (122) and 101 return to their resting or open positions and apply air pressure to the conduit 109' and tank 109. The hand valve 99, similar to the hand valve 98, can not be placed in the operating position until a locking pin safety mechanism 106, identical to the mechanism 104, has received releasing pressure from the discharge line of the hand valve 98. The function of the safety lock pin mechanism 106 is to assure the connection of the connector 16 with the king pin prior to the passing of the air pressure through the central openings which leads to the trailer brake system. If a leak proof sealing connection is not made prior to the passing of this pressure, an escape or blast of high pressure air occurs between the mating surfaces with the possibility of damaging the sealing members.

Assuming the system is now conditioned to raise the dolly wheels before the release of the trailer brakes, the dolly wheels are raised by the movement of the dolly wheel switch to the "up" position which will energize relay 133 from lines 131' and 133' as already described for the dolly control circuit. The relay 133, with the limit switch 118D in DN position will in turn energize the motor 116 through circuit 131", switch 118D and motor 116 to ground and start the raising of the dolly support wheels. The rotary limit switch 118U on the motor will break the circuit of the solenoid operated valves 101 and 110 at the 107" contact and make at 132" when the dolly wheels have reached the extreme upward position. This is assured since the pressure transducer 102, being closed by the pressure of hand lever 97, and the pressure transducer 107, remaining closed through non-operation of hand lever valve 99, has completed the dolly control circuit to continue energization of the relay coil 133 for the motor to drive the rotary limit switch 118 until the switch 118D is opened even though the switch 118U may have already been moved to break contact with line 107". Therefore, upon reaching the extreme upward position of the dolly wheels, relay X is deenergized when switch 117 is moved to neutral and solenoid valve 110 goes open to allow air pressure to the trailer brakes to release them through normally open valve 111 when valve 99 is actuated. The operator, or driver, is now ready to move forward with the trailer completely engaged or hooked to the tractor.

The first thing the operator will do as the tractor-trailer combination starts to move is to actuate his brake pedal 14 to make sure the trailer brakes are in an operating condition. This reveals whether the valve 111 closes when energized through pedal contact 14a, line 120a, solenoid 120 and valve 111 to ground to prevent more air reaching the brake from tank 109 and whether deenergized valve 113 opens to let trapped pressure out through bleed 114 and permit spring 112s to begin to apply the brake. The control of the trailer brakes and the tractor brakes is co-ordinated for actuation with the movement of the pedal 14. Partial movement of the brake pedal engages contact 14a and actuates the normally open solenoid valves 93 of the tractor brakes and 111 of the trailer brakes to cut off any additional pressure reaching the brake cylinders 94 and 112 respectively, and with a continual downward movement of the pedal 14 the pedal closes against button 14b on the armature of switch 14s and opens it to deenergize the normally open solenoid valves 95 of the tractor brakes and 113 of the trailer brakes, which are closed when energized, thus allowing the locked pressure within the brake cylinders to be bled to the atmosphere through bleed elements 96 and 114. Slight retraction of the pedal will close switch 14s to again energize valve 113 to closed position whereby a partial application of brakes is maintained by trapping partial pressure in the cylinders 112 and 94. In the trailer brake system, the rate of exhaustion of the locked pressure within the brake cylinder is controlled by the bleed 114, while the rate of exhaustion of the locked pressure of the tractor brake system is controlled by the hand operated variable needle valve 96. Therefore, if upon application of the brakes the operator senses a sudden pulling by the trailer, he will immediately realize that the trailer brakes are applying faster than the tractor brakes and will be able to make corrective adjustments with the needle valve 96 to change the rate of braking of the tractor. Likewise, if upon application of the brakes the operator senses a sudden pushing by the trailer, he will realize that his tractor brakes are being applied faster than the trailer brakes and a corrective measure may be made by controlling the opening in the needle valve 96. We have therefore provided a means whereby each individual operator may set the braking system of the tractor to co-ordinate with the braking system of the trailer to suit his own preference by the type of terrain to be traveled and load to be carried.

The utilization of the air cylinder system, as previously described, for raising or lowering the dolly wheels is accomplished in the exact sequence as described for the use of the electric motor system. The only difference being that the rotary limit switches on the shaft of the electric motor system operate to lower or raise the dolly wheels by reversing the rotation of the motor while in the air cylinder system the reversing of the switch 117 in the cab will energize one inlet solenoid and de-energize the other, and vice versa, thus reversing the direction of the movement of the piston through lines 132' and 133', relays 132 and 133, and lines 116D and 116U for valves 123 and 124, respectively, to control the positioning of the dolly support wheels.

Assume now that the tractor-trailer combination is connected and the driver wishes to disconnect the tractor completely from the trailer. After first positioning the trailer in the desired location, the driver will set the tractor brakes by the movement of the braking pedal 14. This applies and sets all brakes. Next, the dolly control switch 117 is turned to down (DN) position and to assure that the trailer brakes will stay in a set position, the operator will actuate the hand lever 99 into the closed or exhaust position which will immediately exhaust the complete trailer brake system to atmosphere through exhaust 99a. The pressure drops to the critical pressure of transducer 107 whereupon it closes its switch and with transducer 102 still closed, relay X is energized from line 131' through switch 117 and line 132', coil 132 and lines 107" and 102' to energize and close valves 111 or 122 for them to trap air in the tank 109 at the critical pressure of the transducer. This traps enough air to do all that remains to be done to accomplish the trailer disconnect. Also the motor 116 is energized to raise the dolly wheels until switch 118V again engages line 107" to maintain energization of relay X when dolly control switch is returned to neutral after switch 118D is reclosed. If by error the operator should accidentally first throw hand lever 98 or hand lever 97, nothing would happen since the exhaust solenoid valve 101 is de-energized. Likewise, if the driver accidentally or intentionally hits the dolly wheel switch 117, nothing will happen as the circuit through 132' relay 132 and lines 107" and 102' to energize either the motor or the proper solenoid of the air cylinder system is incomplete until the pressure transducer 107 has gone to the closed position. This closure is only possible when the line leading to the trailer brakes has been reduced to 15 p.s.i. or less. Being assured that the trailer brakes are in a locked condition and the circuit closed which energizes relay X and having electrical power supplied to the relay coil 132 along with the energization of relay X the driver may now lower the dolly support wheels by moving the dolly wheel switch 117 to the down position if he has not already done so. The motor 116 or the air cylinder 125 will be actuated since both pressure transducers 107 and 102 are now closed to enable completing the circuit through lines 132', relay 132 and to ground through lines 107" and 102'. When the dolly wheels reach the extreme downward position the circuitry of the limit switch 118 will keep the solenoid valve 110 energized in a closed position by relay X being energized whereby no pressure will be permitted to pass to the trailer brakes and release them while at the same time the exhaust solenoid valve 101 will have been energized for open position. It is apparent that the pressure transducer 107 provides a safety means which requires the trailer brakes to be in a locked condition before the dolly support wheels can be lowered and the brakes are kept locked even after the dolly support wheels are down.

With the trailer brakes set and the dolly support wheels in the downward position, the operator is ready to disconnect the connector from the king pin and release the king pin from the fifth wheel. Next the hand valve 98 is moved to its initial position and the piston 44 is opened to vent through the check valve 103 and passage 98' and the open hand valve 105. Thereupon by returning the hand valve 97 into its initial closed or exhaust position, not only will the pressure in piston 44 be exhausted to atmosphere through the now energized open solenoid valve 101, but also the holding pressure of the lock bolt piston 54 will be exhausted and pressure will pass to the other end of lock bolt piston 100 through conduit 100' from tank 91 forcing it to the open position. The pressure in the piston 44 will pass to atmosphere regardless whether the hand control valve 98 is placed in a closed or exhaust position since the pressure will flow through either of the two lines, either the line with the check valve 103 in one position or by passing the check valve through the inlet line 98' in the alternate position. The pressure in line 100" is exhausted also and the transducer switch 102 opens. The transducer 102 is provided to de-energize the circuit energizing relay X upon the reduction of the pressure in the tractor line to a point below 15 p.s.i. This deactivates dolly switch 117 and assures us that the solenoid valve 101 will remain in the open position to permit a substantially complete exhaustion of the pressure from one side of the locking bolt cylinder 100, i.e., to a pressure less than 15 p.s.i. Having released all of the operative pressure, the driver drives the tractor away from the trailer and as the king pin moves away from the connector in a longitudinal direction, the spring operated cover plate 130 will resume its protective position over the upper surface 29 of the connector 16 to seal out any contamination. The driver may place the tractor in operation on the highway immediately without any additional steps since the valves 98 and 99 are now in a safe locked position due to the locking mechanism 104 and 106 and if, perchance, the operator should place the hand valve 97 into the operational position, again nothing would happen other than the free actuation of the lock bolt cylinder. As soon as the connector 16 disengaged from the king pin, the electrical circuit supporting the solenoids 101 and 110 is broken in line 107", permitting the solenoid valve 101 to rest in closed position and the solenoid valve 110 on the trailer to remain in open position. This again provides assurance that no pressure has been trapped in the trailer brake system which might cause a release of the brakes.

To those skilled in the art it is readily apparent that the structure provided for by this invention does not only provide an approved service system and mechanism for connecting the service lines but a system which is completely operable from the tractor cab. The invention has further provided a manual adjustment to permit the operator to set the sequence and timing of the dual brake system to suit his preference, and a completely fail-safe system which not only protects the operator and the system, but provides the necessary safety to the public as the tractor-trailer combination is operated on the highways. Moreover, the invention provides a completely automatic mechanism for connecting and disconnecting the tractor with the trailer, having functional controls that are error proof in sequence of operation and completely eliminates reliance on the skill of the operator.

The system permits almost instantaneous application of the tractor brakes and the trailer brakes when the operator actuates the braking lever. The pressure for the trailer brakes has but a short distance to travel to the braking cylinder rather than having to travel the complete length of the trailer as now experienced in the conventional systems. Not only does this system provide a positive control of the tractor-trailer combination by the driver, but provides for effective control and co-ordination of two or more trailer brake systems with one tractor brake system to permit a train of one tractor and several trailers to be safely operated together.

It is realized that the actual details of the construction and arrangement of the several component parts may be readily modified by one skilled in the art, and the inventors only intend to be limited to a reasonable interpretation of the appended claims covering the construction as illustrated and described.

What is claimed is:

1. In a tractor-trailer vehicle combination a connector mechanism in combination with a service system for co-ordinating the electrical actuation of the tractor brakes with the trailer brakes normally applied by spring action upon the release of air pressure when in the connected position comprising a first connector member in the form of a fifth wheel secured to the tractor, a second connector member in the form of a king pin secured to the trailer, a slidable connector block resiliently secured to said first connector for reciprocation therewith to engage said second connector member, an air pressure and electrical power source secured to the tractor, control means for actuating the brakes, first conduit members secured to the tractor interconnecting said air pressure source with the tractor brakes including a normally open de-energized solenoid valve, and said power sources with the connector block and the control means, second conduit members secured to the trailer interconnecting the trailer brakes with the second connector member including an air pressure conduit having a normally open de-energized solenoid valve and energized air exhaust solenoid valves for the brakes, locking means to secure the second connector member in a locked relationship with the first connector member, and means to couple the connector block with said second connector to effect a leak proof transmission of air pressure which releases the brakes and electrical contact between the first conduit members and the second conduit members for controlling the combined application of the brakes, said control means including a manual control member mounted on the tractor which energizes said solenoid valves to cut off air pressure supply to the brakes and de-energizes the exhaust solenoids to apply the brakes.

2. The invention as set forth in claim 1 wherein said control means further includes a plurality of sequentially operative interrelated hand operated control valves for directing air under pressure to said air pressure conduit and an electrically operated solenoid valve controlling the admission of air in said air pressure conduit to said solenoid valves for the brakes.

3. The invention as set forth in claim 1 wherein said locking means comprise a spring driven latch type lock bolt member and a piston forced to a locking position by hand controlled application of air supplied to the trailer and to a positive releasing position by reverse application of air pressure.

4. The invention as set forth in claim 1 wherein said means to couple the connector block to the king pin comprises an air piston controlled by air interlocked valves for moving the connector block into engagement with the king pin sequentially during air locked application of said lock bolt member.

5. In a tractor-trailer vehicle combination an automatic connector mechanism in combination with a service system for coordinating the control of retractible trailer dolly wheels with the trailer brakes when in a connected relationship with a tractor comprising a first connector member in the form of a fifth wheel secured to the tractor, a second connector member in the form of a king pin secured to the trailer, a protractible connector block mounted on said first connector, an air pressure and electrical power source secured to the tractor, control means mounted within the tractor, first conduit members secured to the tractor interconnecting said power sources with the tractor brakes, the connector block and the control means, second conduit means secured to the trailer interconnecting the trailer brakes with the second connector member, locking means to secure the second connector member in a locked relationship with the first connector member, coupling means to couple said connector block with said second connector member, and means secured within said connector block and said second connector member to provide straight through communication from the power sources to the trailer brakes to effect coordinated control of the braking power, said control means including a dolly position responsive mechanism interlocked with said locking means to render it inoperative to release when the dolly wheels are in retracted position.

6. The invention as set forth in claim 5 wherein said control means comprise a plurality of sequentially interrelated hand operated control valves in conjunction with a plurality of electrically operated solenoid valves controlling the locking means in relation to dolly wheel position.

7. The invention as set forth in claim 5 wherein said locking means comprise a lock bolt member and a piston forced to a locking position by a compression spring and to a releasing position by the force of air pressure.

8. In a tractor-trailer vehicle combination a connector mechanism in combination with a service system for coordinating the application of the tractor brakes with the trailer brakes when in a connected relationship comprising a first connector member in the form of a fifth wheel secured to the tractor, a second connector member in the form of a king pin secured to the trailer, a resiliently mounted connector block in juxtaposition with the fifth wheel for alignment with the king pin when said king pin is in locked relationship with said fifth wheel, first conduit members secured to the tractor, second conduit members secured to the trailer, an air pressure and electrical power source secured to the tractor, control means mounted in said first conduit member to interconnect said tractor brakes with the power sources and the connector block, said second conduit members interconnecting said king pin with the trailer brakes, an air piston having an orientation mechanism interrelated therewith to rotatively orientate, align and engage the connector block with the king pin, whereby the first conduit members are connected to the second conduit members for effective control of the combined braking power.

9. An automatically operated coupling mechanism for connecting and disconnecting the service lines between a tractor-trailer vehicle combination in conjunction with the coupling of the vehicles comprising a fifth wheel structure pivotally secured on the tractor, a king pin structure secured to the trailer, a connector block, means to resiliently secure the connector block to the fifth wheel for reciprocating movement therewith, a first conduit member for fluid pressure centrally secured and passing through the length of the king pin, a second conduit member for fluid pressure centrally secured and passing through the length of the connector block, a first insulating element providing a plurality of electrical contact socket rings in the form of concentric circles, said first element disposed in a recess on a lower surface of the king pin, a second insulating element providing a plurality of electrical contact pins for engagement with said socket rings when the connector block engages the king pin, means to secure said second insulating element within the connector block, means to bias said contact pins for positive engagement with said socket rings, means to couple the connector block with the king pin to effect a perfect leak proof connection of the service lines of the tractor with the service lines of the trailer regardless of angular relationship of the tractor relative to the trailer.

10. The invention as set forth in claim 9 wherein the means to resiliently secure the connector block to the fifth wheel comprise a plurality of guide members having spring actuated ball members extending outwardly therefrom in contact with the outer surface of the connector block to guide the connector as it reciprocates therein and to absorb angular deflections of the connector induced by the mating king pin as the position of the tractor varies relative to the tractor during operation as a combined unit.

11. The invention as set forth in claim 9 wherein said means to secure said second insulating element within the connector block comprises a guide pin threaded in the side of the connector block with the end thereof engaging a slot formed in the side of the insulating element.

12. The invention as set forth in claim 9 wherein means to bias said contact pins for positive engagement with said socket rings comprise a compression spring interposed between the connector block and the second insulating element in which the contact pins are embedded and a compression spring interposed between each of said contact pins and the second insulating element whereby the combined spring forces maintain positive contact of the pins with the socket rings.

13. The invention as set forth in claim 9 wherein said means to couple the connector block with the king pin comprises a piston secured thereto for raising or lowering the connector block into engagement with the king pin.

14. An automatically operated coupling mechanism for connecting or disconnecting the service lines between a tractor-trailer vehicle combination in conjunction with coupling the vehicles together comprising a fifth wheel structure pivotally secured to the tractor, a cooperating king pin structure secured to the trailer, a connector block secured to the fifth wheel, said connector block aligned to engage the king pin when the king pin is locked in the fifth wheel, pairs of contacts, first half of each pair of contacts embedded in an insulating element recessed in a lower surface of the king pin in the form of socket rings spaced in concentric circles, second half of each pair of contacts detachably secured in the connector block in the form of resiliently mounted contact pins, an insulating element to support the contact pins, a compression spring interposed between the connector block and the insulating element to continually urge said contact pins upwardly to engage said socket rings, means to limit the reciprocating travel and rotary movement of the insulating element, a centrally mounted flow passage through the length of said connector, a mating centrally mounted flow passage through the length of said king pin and means to join the connector block to the king pin to provide a continuous path for the flow of the electrical and the pressure power from the tractor to the trailer regardless of the angular relationship between the tractor and trailer.

15. A service system for a tractor-trailer vehicle combination for controlling the application of the braking power thereof during the procedure of connecting and disconnecting the tractor with the trailer and while operating the tractor as a combined unit comprising an air pressure means and electrical power means connected to a tractor brake system, a first normally open electrically operated solenoid valve connected in the tractor brake system pressure inlet line between the pressure means and a brake cylinder, a second normally open electrically operated solenoid valve connected in the brake system exhaust line between said first valve and said brake cylinder, a hand operated needle valve connected on the exhaust side of said second valve to effectively control the rate of exhaustion of the pressure in said brake cylinder which controls the tractor brakes, control means interconnected between the pressure means and a trailer brake system and operating means mounted within the tractor, the air pressure means and electrical power means interconnected with the tractor brake system, the trailer brake system to effectively coordinate the application of the combined braking power of the vehicles.

16. A service system for a tractor-trailer vehicle combination for controlling the application of the braking power thereof during the procedure of connecting and disconnecting the tractor with the trailer and while operating the tractor as a combined unit comprising an air pressure and electrical power means, a tractor brake system, means interconnecting said air pressure means and tractor brake system to control the pressure thereto, a trailer brake system, said trailer brake system interconnected with said air pressure means having a first normally open electrically operated solenoid valve connected between said air pressure means and a brake cylinder, a second normally open electrically operated solenoid valve in an exhaust line connected between said first valve and said brake cylinder, a fixed orifice connected on the exhaust side of said second valve to retard the rate of exhaustion of the pressure on the brake cylinder as the brakes are applied, and operating means mounted within the tractor interconnected with the tractor brake system, the trailer brake system, the air pressure and electrical power means to effectively coordinate the application of the combined braking power of the vehicles.

17. A service system for a tractor-trailer vehicle for controlling the application of the braking power of the tractor with the trailer while connecting, disconnecting or operating as a combined unit comprising an air pressure system, an electrical power system, control means, and means to interconnect the electrical and air pressure systems with the control means to provide an effective control of the application of the braking power, said electrical system comprising an electrical source of a 12 v. battery, a master throw switch mounted within the tractor for energizing the electrical system, relay members inter-connected with pairs of electrically operated solenoid valves controlling the tractor brakes and the trailer brakes respectively, said relays energizing or de-energizing the pairs of solenoid valves to effectively control the braking power, a reversible electric motor for raising or lowering a pair of dolly support wheels, a polarity switch mounted within the tractor, said polarity switch inter-connected with said electrical motor, a rotary limit switch secured to the electric motor, said rotary limit switch having contacts thereon inter-connected with the air pressure control system, and means inter-connected with said air pressure system and electric motor for de-energizing said motor when the rotary limit switch has reached an extreme position.

18. A service system for a tractor-trailer vehicle combination for controlling the application of the combined braking power comprising an air pressure tractor brake system to apply the tractor brakes by exhausting the pressure thereon, a hand operated needle valve connected to the tractor brake system to vary the rate of exhaustion of the air pressure on said tractor brakes, an air pressure trailer brake system to apply the trailer brakes by exhausting the pressure thereon, a fixed orifice connected to the trailer brake system to provide a constant rate of exhaustion of the air pressure on the trailer brakes, and means to connect the tractor brake system with the trailer brake system whereby the rate of application of the tractor brakes may be varied to apply in advance of, behind or at the same as the trailer brakes by movement of said hand operated needle valve.

19. An automatically operated coupling mechanism for connecting and disconnecting the service lines between a tractor-trailer vehicle combination in conjunction with coupling the vehicles comprising a fifth wheel structure secured on the tractor, a king pin structure secured on the trailer, locking means for pivotally securing said king pin on said king pin structure, a connector block in juxtaposition with the fifth wheel for reciprocation therein, conduit members secured to the tractor connecting the tractor brake system to the connector block, conduit members secured to the trailer connecting the trailer brake system to the king pin structure, conduit passages for air pressure and electrical control wire through the length of said connector block and said king pin, means controlled by said locking means to orientate, align and connect the connector block with the king pin structure whereby said conduit members of the tractor and the trailer are connected to provide a straight through connection for the air pressure and control wire circuits from the tractor to the trailer, and air responsive means connected to trailer conduit member including air actuated brake actuators on said trailer controlled from the tractor through said electrical control wires and including transducer switches responsive to the presence of air under pressure in said conduit passages and a cut off valve in said conduit member controlled by the switches in relation to the pressure in said conduit passages.

20. An automatically operated coupling mechanism for connecting and disconnecting the service lines between a tractor-trailer vehicle combination in conjunction with coupling the vehicles comprising a fifth wheel structure secured on the tractor, a king pin structure secured on the trailer, a connector block in juxtaposition with the fifth wheel for reciprocation therein, conduit members secured to the tractor connecting the tractor brake system to the connector block, conduit members secured to the trailer connecting the trailer brake system to the king pin structure, conduit passages through the length of said connector block and said king pin and means to orientate, align and connect the connector block with the king pin structure whereby said conduit members of the tractor and the trailer are connected to provide a straight through flow path for the power from the tractor to the trailer, said means to orientate, align and connect the connector block with the king pin comprises a groove formed in the lower surface of the king pin which provides a stop and locator opening, a locator pin secured to the surface of the connector and extends upwardly for engagement of said groove, said connector block secured to a piston to raise or lower the connector block into engagement within the king pin, said piston providing an orientating mechanism therein consisting of a rotatable pressure blade secured to the piston shaft, a torque spring forcing said blade in one direction and said blade rotatable in the other direction by air pressure from the piston whereby said rotary movement of the blade rotates the connector block until the locator pin engages the stop in the groove on the king pin and the axial force of the piston will engage the locator pin into the locator opening which permits proper engagement of the conduit passage of the connector block with the conduit passages of the king pin structure.

21. An automatically operated coupling mechanism for connecting or disconnecting the service lines between a tractor-trailer vehicle combination and to couple the vehicles together comprising a fifth wheel structure on the tractor, a cooperating king pin structure on the trailer, a connector block in juxtaposition on the fifth wheel for engagement with the lower surface of the king pin when the king pin is in a locked relationship with the fifth wheel, means for urging engagement between said connector block and king pin, a plurality of pairs of contacts, first half of each pair of contacts embedded in an insulating element detachably secured in the lower surface of the king pin, second half of each pair of contacts embedded in an insulating element detachably secured in an upper surface of the connector block for mating engagement with said first half of contacts when the connector block is positioned against the king pin, one of said halves of contacts comprising individually resiliently mounted contact elements to maintain electrical contact under all relative movements between said tractor and trailer, and fluid conduit passages through the length of said connector block and said king pin to provide a continuous flow path for the electrical and fluid service lines from the tractor to the trailer.

22. A service system for a tractor-trailer vehicle for controlling the application of the braking power of the tractor with the trailer while connecting, disconnecting or operating as a combined unit comprising an air pressure system, an electrical power system, control means, and means to interconnect the electrical and air pressure systems with the control means to provide an effective control of the application of the braking power, said air pressure system comprises a pressure source, a pair of electrically operated inter-connected solenoid valves controlling the pressure to tractor brakes released by the application of air under pressure, hand operated control throw valves inter-connected to the pressure source, each of said throw valves interrelated with one another, one of said hand operated throw valves effectively controlling the pressure to a lock bolt piston for securing the trailer to the tractor, a second hand operated throw valve effectively controlling the pressure to a piston for positioning a connector member on the tractor against a connector member on the trailer, said second valve held in an inoperable position by a locking mechanism activated by pressure from said lock bolt piston, a third hand operated throw valve effectively controlling the pressure to the trailer brakes to release them, said third valve being held in an inoperable position by a locking mechanism activated by pressure from said connector piston, means through the tractor connector member and the trailer connector member to effectively pass the air pressure controlled by said third hand operated throw valve to the brakes, a normally closed exhaust solenoid valve connected to an exhaust port of said first hand throw valve, a normally open solenoid valve mounted between said tractor connector member and the trailer brakes, said exhaust solenoid valve inter-connected electrically with said normally open solenoid valve between the trailer connector and the trailer brakes for coordinated action, and a pair of solenoid operated inter-connected valves to control the pressure applied to the trailer brakes.

23. An automatically operated coupling mechanism for connecting or disconnecting the service lines between a tractor-trailer vehicle comprising a tractor fifth wheel structure, a trailer king pin structure, a connector block in juxtaposition with the fifth wheel for reciprocation therein, conduit members secured to the tractor connecting the service system of the tractor with the connector block, conduit members secured to the trailer interconnecting the service system of the trailer with the king pin, conduit passages through the length of said connector block and said king pin, and means to connect said connector block to said king pin whereby said conduits are coupled to provide a straight through flow path for the power from the tractor to the trailer, said trailer king pin structure including a central opening through the length thereof for receipt of an air pressure conduit, said conduit being electrically insulated from the connector block, a conduit opening passing through the length of the block off set from the central opening for receipt of an electrical cable, a recess formed in a lower surface of the king pin, an insulating element detachably secured within said recess, said insulating element having its lower surface inwardly from the lower surface of the king pin structure to provide a plurality of equally spaced socket rings therein which are connected to a plurality of lead wires from said electrical cable.

24. An automatically operated coupling mechanism for connecting or disconnecting the service lines between a tractor-trailer vehicle comprising a tractor fifth wheel structure, a trailer king pin structure, a connector block in juxtaposition with the fifth wheel for reciprocation therein, conduit members secured to the tractor connecting the service system of the tractor with the connector block, conduit members secured to the trailer interconnecting the service system of the trailer with the king pin, conduit passages through the length of said connector block and said king pin, and means to connect said connector block to said king pin whereby said conduits are coupled to provide a straight through flow path for the power from the tractor to the trailer, said connector block including a central opening through the length thereof for the receipt of an air pressure conduit, said conduit being electrically insulated from the connector block by an insulating sleeve, a recess formed in the upper surface of the block, an insulating element in sliding relationship within the recess, a compression spring disposed between the lower surface of the insulating element and the bottom wall of the recess to urge the insulating element in an outwardly direction, means interconnecting the insulating element and the connector block to prevent rotation of the insulating element relative to the block, a conduit opening passing through the length of the connector block off set from said central opening for receipt of an electrical cable, a sealing groove formed on the upper surface of the block for the receipt of a sealing member and resiliently mounted contact pins equally spaced across the upper surface of the insulating element which are connected to a plurality of lead wires from said electrical cable.

25. An automatically operated coupling mechanism for connecting or disconnecting the service lines between a tractor-trailer vehicle comprising a tractor fifth wheel structure, a trailer king pin structure, a connector block in juxtaposition with the fifth wheel for reciprocation therein, conduit members secured to the tractor connecting the service system of the tractor with the connector block, conduit members secured to the trailer interconnecting the service system of the trailer with the king pin, conduit passages through the length of said connector block and said king pin, and means to connect said connector block to said king pin whereby said conduits are coupled to provide a straight through flow path for the power from the tractor to the trailer, said trailer king pin structure having a plurality of electrical tracks extending outwardly from a lower king pin surface, said tracks being connected to a plurality of lead wires interconnected with the service system of the trailer brakes, and said connector block providing a plurality of contact pins extending in an upward direction above an upper surface, said contact points being connected to a plurality of lead wires interconnected with the service system of the tractor brakes, said contact pins engaging the electrical tracks of the king pin when said connector block is coupled with the king pin in an operating position.

(References on following page)

References Cited by the Examiner
UNITED STATES PATENTS

| | | | |
|---|---|---|---|
| 1,739,496 | 12/29 | Bartholomew | 280—427 |
| 1,805,642 | 5/31 | Strachan | 280—422 |
| 1,936,832 | 11/33 | Even | 280—427 |
| 2,053,614 | 9/36 | Johnson | 280—421 |
| 2,232,754 | 2/41 | Winn | 280—427 |
| 2,344,902 | 3/44 | Sexton | 303—20 |
| 2,380,765 | 7/45 | Keith. | |
| 2,451,268 | 10/48 | Affleck | 303—8 |
| 2,457,478 | 12/48 | Letvin | 280—421 |
| 2,618,492 | 11/52 | Singer | 280—150 |
| 2,694,468 | 11/54 | Price. | |
| 2,850,292 | 9/58 | Holland | 280—434 |
| 2,852,316 | 9/58 | Staley | 188—170 X |
| 2,859,980 | 11/58 | Holland | 280—421 |
| 2,924,464 | 2/60 | Zajac et al. | 280—421 |
| 2,926,889 | 3/60 | Obes | 254—86 |
| 2,998,267 | 8/61 | Zajac | 280—421 X |

PHILIP ARNOLD, *Primary Examiner.*

LEO FRIAGLIA, *Examiner.*